United States Patent
Ganji et al.

(10) Patent No.: US 11,753,965 B1
(45) Date of Patent: Sep. 12, 2023

(54) VARIABLE BLEED VALVES WITH INNER WALL CONTROLLED-FLOW CIRCUITS

(71) Applicant: General Electric Company, Schenectady, NY (US)

(72) Inventors: Nageswar Rao Ganji, Bengaluru (IN); Ravindra Shankar Ganiger, Bengaluru (IN); Hiranya Kumar Nath, Bengaluru (IN); Trevor H. Wood, Niskayuna, NY (US); Srinivas Nuthi, Bengaluru (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/732,179

(22) Filed: Apr. 28, 2022

(51) Int. Cl.
*F01D 25/24* (2006.01)
*F02C 9/18* (2006.01)

(52) U.S. Cl.
CPC ............... *F01D 25/24* (2013.01); *F02C 9/18* (2013.01); *F05D 2250/38* (2013.01); *F05D 2260/606* (2013.01)

(58) Field of Classification Search
CPC .......... F05D 2260/606; F05D 2250/38; F05D 2250/232; F01D 25/32; F01D 25/162; F01D 25/24; F02C 6/08; F02C 3/04; F02C 9/18
See application file for complete search history.

(56) References Cited

U.S. PATENT DOCUMENTS

| | | | |
|---|---|---|---|
| 6,679,048 B1 | 1/2004 | Lee et al. | |
| 6,802,691 B2 | 10/2004 | Chlus | |
| 8,136,342 B2 | 3/2012 | Bertolotti et al. | |
| 10,260,427 B2 | 4/2019 | Buey et al. | |
| 10,518,605 B2 | 12/2019 | Molin et al. | |
| 2007/0089422 A1* | 4/2007 | Widenhoefer | F01D 5/145 60/39.17 |
| 2011/0265490 A1 | 11/2011 | Klasing et al. | |
| 2015/0176500 A1* | 6/2015 | Taylor-Tibbott | B33Y 10/00 60/785 |
| 2016/0312704 A1* | 10/2016 | Suciu | F02C 3/13 |
| 2017/0122213 A1* | 5/2017 | Bowden | F02C 6/08 |
| 2018/0119619 A1* | 5/2018 | Watson | F02C 9/18 |
| 2018/0283183 A1* | 10/2018 | Gallier | F01D 9/04 |

FOREIGN PATENT DOCUMENTS

FR 3129432 5/2023
GB 2580128 B 12/2021

OTHER PUBLICATIONS https://www.engineersedge.com/fluid_flow/pressure_drop/pressure_drop.htm; Mar. 13, 2005.*

* cited by examiner

Primary Examiner — Todd E Manahan
Assistant Examiner — Rodolphe Andre Chabreyrie
(74) Attorney, Agent, or Firm — HANLEY, FLIGHT & ZIMMERMAN, LLC

(57) ABSTRACT

Variable bleed valves with inner wall controlled-flow circuits are disclosed. An example apparatus disclosed herein includes a casing segment defining a first flow path, a variable bleed valve port defining a second flow path, and a channel formed in the casing segment, the channel including a first opening into the first flow path, and a second opening into the second flow path, the channel defining a third flow path between the first opening and the second opening.

20 Claims, 6 Drawing Sheets

VARIABLE BLEED VALVES WITH INNER WALL CONTROLLED-FLOW CIRCUITS

FIELD OF THE DISCLOSURE

This disclosure relates generally to turbine engines and, more particularly, to variable bleed valves.

BACKGROUND

Turbine engines are some of the most widely-used power generating technologies, often being utilized in aircraft and power-generation applications. A turbine engine generally includes a fan and a core arranged in flow communication with one another. The core of the turbine engine generally includes, in serial flow order, a compressor section, a combustion section, a turbine section on the same shaft as the compressor section, and an exhaust section. Typically, a casing or housing surrounds the core of the turbine engine.

Figure 1:
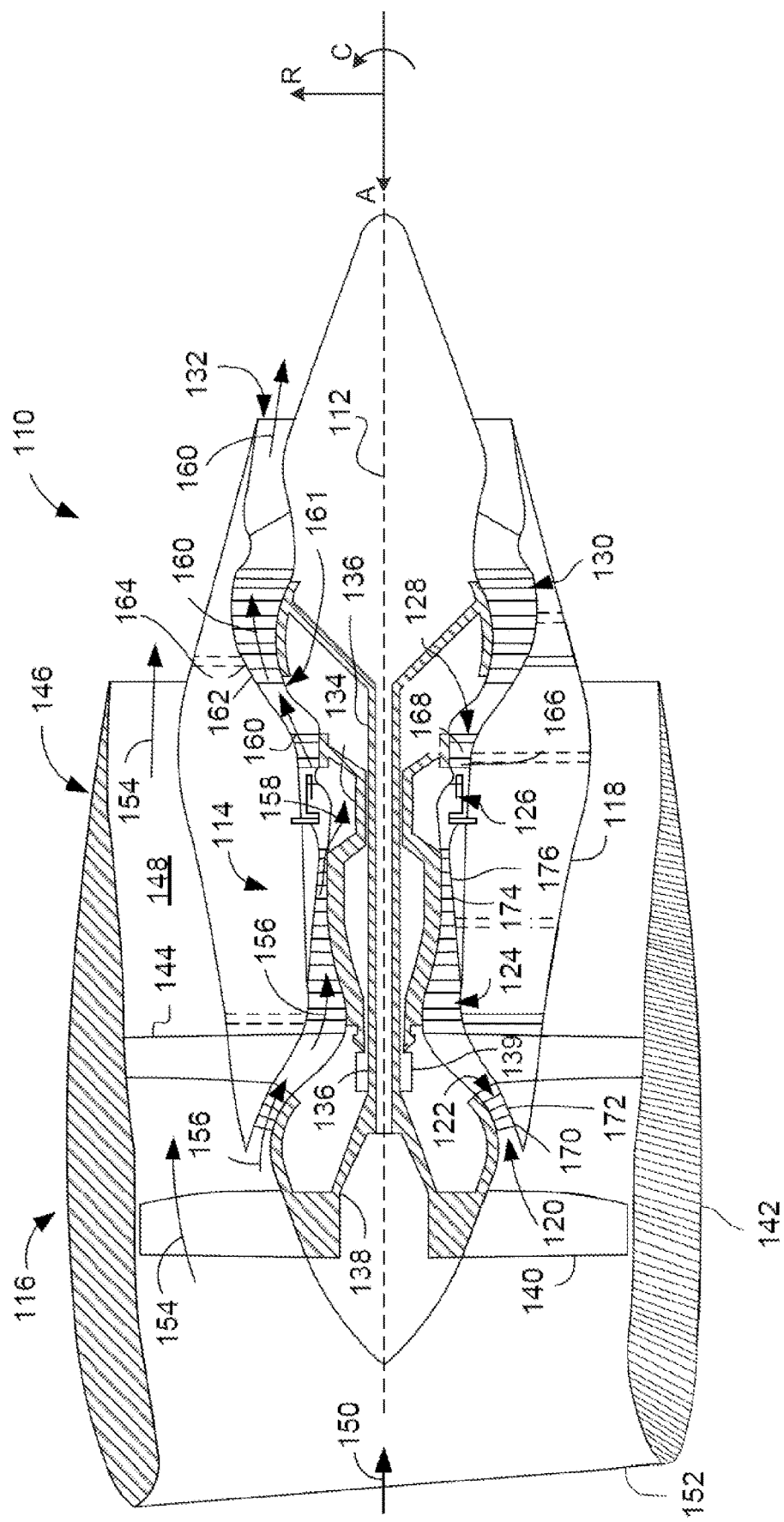
FIG. 1 is a cross-sectional view of an example gas turbine engine in which examples disclosed herein may be implemented.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In some examples used herein, the term "substantially" is used to describe a relationship between two parts that is within three degrees of the stated relationship (e.g., a substantially colinear relationship is within three degrees of being linear, a substantially perpendicular relationship is within three degrees of being perpendicular, a substantially parallel relationship is within three degrees of being parallel, a substantially flush relationship is within three degrees of being flush, etc.).

The terms "upstream" and "downstream" refer to the relative direction with respect to fluid flow in a fluid pathway. For example, "upstream" refers to the direction from which the fluid flows, and "downstream" refers to the direction to which the fluid flows. Various terms are used herein to describe the orientation of features. In general, the attached figures are annotated with reference to the axial direction, radial direction, and circumferential direction of the vehicle associated with the features, forces and moments. In general, the attached figures are annotated with a set of axes including the axial axis A, the circumferential axis C, and the radial axis R.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized. The following detailed description is therefore, provided to describe an exemplary implementation and not to be taken limiting on the scope of the subject matter described in this disclosure. Certain features from different aspects of the following description may be combined to form yet new aspects of the subject matter discussed below.

DETAILED DESCRIPTION

In certain gas turbine operating conditions, the rotor blade tips of the low-pressure compressor (LPC) cause turbulent airflow that generates an acoustic tone when the airflow encounters the cavity of a variable bleed valve. These generated acoustic tones can cause negative harmonic effects (e.g., crack formation, fracture, etc.) in the other components of the LPC. Examples disclosed herein include channels formed in the casing of the LPC which has controlled flow-circuits upstream of the entry of to the variable bleed valve (VBV) cavity. As used herein, the terms "channel" and the term "flow circuit" are used interchangeable to refer to comparatively small flow paths defined by a casing of a gas turbine. In some examples disclosed herein, the airflow associated with the channels decreases the instability and acoustic effect associated with the flow of air over the VBV cavity. Examples disclosed herein reduce and/or eliminate the VBV acoustic resonance impacts by improving cavity conditions when compared to prior configurations.

A turbine engine, also referred to herein as a gas turbine engine, is a type of internal combustion engine that uses atmospheric air as a moving fluid. In operation, atmospheric air enters the turbine engine via a fan and flows through a compressor section where one or more compressors progressively compresses (e.g., pressurizes) the air until it reaches the combustion section. In the combustion section, the pressurized air is combined with fuel and ignited to produce a high-temperature, high-pressure gas stream (e.g., hot combustion gas) before entering the turbine section. The hot combustion gases expand as they flow through a turbine section, causing rotating blades of one or more turbines to spin. The rotating blades of the turbine produce a spool work output that powers a corresponding compressor. The spool is a combination of the compressor, a shaft, and the turbine. Turbine engines often include multiple spools, such as a high pressure spool (e.g., HP compressor, shaft, and turbine) and a low-pressure spool (e.g., LP compressor, shaft, and turbine). A turbine engine can include one spool or more than two spools in additional or alternative examples.

During low-speed operation of the turbine engine (e.g., during start-up and/or stopping), the equilibrium of the engine is adjusted. In many situations, a delay is required for the spool(s) to adapt (e.g., a time for a rotational speed to adjust for a new equilibrium). For example, if the fuel flow rate is reduced so as to cause the turbine to reduce the power produced and the mass flow through the engine, the HP and LP spools of the engine will decelerate. This deceleration will be at different rates however, which can cause both the LP and HP compressors to throttle off their optimal operating conditions potentially leading to compressor instabilities, such as compressor stall and/or compressor surge. Compressor stall is an abnormal airflow resulting from the aerodynamic stall of rotor blades within the compressor. Compressor stall causes the air flowing through the compressor to slow down or stagnate. In some cases, the disruption of airflow as the air passes through various stages of the compressor can lead to compressor surge. Compressor surge refers to a stall that results in disruption (e.g., complete disruption, majority disruption, other partial disruption, etc.) of the airflow through the compressor.

A variable bleed valve (VBV) is often integrated into a compressor to increase efficiency and limit possible stalls. The VBV enables the turbine engine to bleed air from a compressor section of the turbine engine during operation. An example VBV assembly includes a VBV port (e.g., opening, air bleed slot, etc.) integrated into a compressor casing that opens via actuation of a VBV door. The VBV is configured as a door that opens to provide a bleed flow path to bleed off compressed air between a low-pressure compressor and high-pressure compressor of a gas turbine. For example, the VBV door may be actuated during a speed-speed mismatch between the LP spool and the HP spool from a design speed equilibrium. During low speed operation or during deceleration for example, the HP spool may spin at a lower speed than its nominal equilibrium with the LP spool. Opening the VBV port allows the LP spool to maintain its speed while reducing the amount of air that is flowing through the HP compressor by directing some of the air flow to other engine components (e.g., the bypass, the turbine, the exhaust area, etc.). The VBV door enables the LP spool (e.g., booster) to operate on a lower operating throttle line and reduces the likelihood for a potential instability and stall conditions.

When a VBV is in a closed position, the VBV door may not be flush with the compressor casing, resulting in a bleed cavity that is open to a main flow path within the compressor. As air flows through the compressor, the airflow may encounter an upstream edge of the bleed cavity. In some examples, a shear layer of the airflow separates from the upstream edge and impinges on a downstream edge of the VBV port, resulting in acoustic wave feedback. When the feedback resonates with the bleed cavity, energetic acoustic tones emanate from the bleed cavity and interact with surrounding hardware. The acoustic tones often resonate with other mechanical components of the turbine engine, which can lead to vibrations that increase stress levels, induce crack formation, and/or cause other mechanical faults in the LPC components.

Examples disclosed herein overcome the above-noted deficiencies and include one or more channels upstream of the VBV port. The one or more channels dampen an acoustic resonant response generated within the bleed cavity. Example channel(s) disclosed herein are controlled flow circuits formed in the case of the gas turbine engine. In some examples disclosed herein, the channel(s) direct a portion of the flow into the shear layer formed by the edge of the VBV port, reducing the instability of the shear layer. Examples disclosed herein mitigate VBV acoustic resonance and reduce the impact of acoustic resonance on booster blades and disks, thereby improving cavity conditions when compared to prior VBV configurations.

Referring now to the drawings, wherein identical numerals indicate the same elements throughout the figures, FIG. 1 is a schematic cross-sectional view of a high-bypass turbofan-type gas turbine engine 110 ("turbofan engine 110"). While the illustrated example is a high-bypass turbofan engine, the principles of the present disclosure are also applicable to other types of engines, such as low-bypass turbofans, turbojets, turboprops, etc. As shown in FIG. 1, the turbofan engine 110 defines a longitudinal or axial centerline axis 112 extending therethrough for reference. FIG. 1 also includes an annotated directional diagram with reference to an axial direction A, a radial axis R, and a circumferential axis C. radial In general, the turbofan engine 110 includes a core turbine or gas turbine engine 114 disposed downstream from a fan section 116. The core turbine 114 includes a substantially tubular outer casing 118 that defines an annular inlet 120. The outer casing 118 can be formed from a single casing or multiple casings. The outer casing 118 encloses, in serial flow relationship, a compressor section having a booster or low-pressure compressor 122 ("LP compressor 122") and a high pressure compressor 124 ("HP compressor 124"), a combustion section 126, a turbine section having a high pressure turbine 128 ("HP turbine 128") and a low-pressure turbine 130 ("LP turbine 130"), and an exhaust section 132. A high pressure shaft or spool 134 ("HP shaft 134") drivingly couples the HP turbine 128 and the HP compressor 124. A low-pressure shaft or spool 136 ("LP shaft 136") drivingly couples the LP turbine 130 and the LP compressor 122. The LP shaft 136 can also couple to a fan spool or shaft 138 of the fan section 116. In some examples, the LP shaft 136 is coupled directly to the fan shaft 138 (e.g., a direct-drive configuration). In alternative configurations, the LP shaft 136 can couple to the fan shaft 138 via a reduction gear 139 (e.g., an indirect-drive or geared-drive configuration).

As shown in FIG. 1, the fan section 116 includes a plurality of fan blades 140 coupled to and extending radially outwardly from the fan shaft 138. An annular fan casing or nacelle 142 circumferentially encloses the fan section 116 and/or at least a portion of the core turbine 114. The nacelle 142 can be partially supported relative to the core turbine 114 by a plurality of circumferentially-spaced apart outlet guide vanes 144. Furthermore, a downstream section 146 of the nacelle 142 can enclose an outer portion of the core turbine 114 to define a bypass airflow passage 148 therebetween.

As illustrated in FIG. 1, air 150 enters an inlet portion 152 of the turbofan engine 110 during operation thereof. A first portion 154 of the air 150 flows into the bypass airflow passage 148, while a second portion 156 of the air 150 flows into the inlet 120 of the LP compressor 122. One or more sequential stages of LP compressor stator vanes 170 and LP compressor rotor blades 172 coupled to the LP shaft 136 progressively compress the second portion 156 of the air 150 flowing through the LP compressor 122 en route to the HP compressor 124. Next, one or more sequential stages of HP compressor stator vanes 174 and HP compressor rotor blades 176 coupled to the HP shaft 134 further compress the second portion 156 of the air 150 flowing through the HP compressor 124. This provides compressed air 158 to the combustion section 126 where it mixes with fuel and burns to provide combustion gases 160.

The combustion gases 160 flow through the HP turbine 128 where one or more sequential stages of HP turbine stator vanes 166 and HP turbine rotor blades 168 coupled to the HP shaft 134 extract a first portion of kinetic and/or thermal energy therefrom. This energy extraction supports operation of the HP compressor 124. The combustion gases 160 then flow through the LP turbine 130 where one or more sequential stages of LP turbine stator vanes 162 and LP turbine rotor blades 164 coupled to the LP shaft 136 extract a second portion of thermal and/or kinetic energy therefrom. This energy extraction causes the LP shaft 136 to rotate, thereby supporting operation of the LP compressor 122 and/or rotation of the fan shaft 138. The combustion gases 160 then exit the core turbine 114 through the exhaust section 132 thereof. A turbine frame 161 with a fairing assembly is located between the HP turbine 128 and the LP turbine 130. The turbine frame 161 acts as a supporting structure, connecting a high-pressure shaft's rear bearing with the turbine housing and forming an aerodynamic transition duct between the HP turbine 128 and the LP turbine 130. Fairings form a flow path between the high-pressure and low-pressure turbines and can be formed using metallic castings (e.g., nickel-based cast metallic alloys, etc.).

Along with the turbofan engine 110, the core turbine 114 serves a similar purpose and is exposed to a similar environment in land-based gas turbines, turbojet engines in which the ratio of the first portion 154 of the air 150 to the second portion 156 of the air 150 is less than that of a turbofan, and unducted fan engines in which the fan section 116 is devoid of the nacelle 142. In each of the turbofan, turbojet, and unducted engines, a speed reduction device (e.g., the reduction gear 139) can be included between any shafts and spools. For example, the reduction gear 139 is disposed between the LP shaft 136 and the fan shaft 138 of the fan section 116.

As described above with respect to FIG. 1, the turbine frame 161 is located between the HP turbine 128 and the LP turbine 130 to connect the high-pressure shaft's rear bearing with the turbine housing and form an aerodynamic transition duct between the HP turbine 128 and the LP turbine 130. As such, air flows through the turbine frame 161 between the HP turbine 128 and the LP turbine 130.

Figure 2:
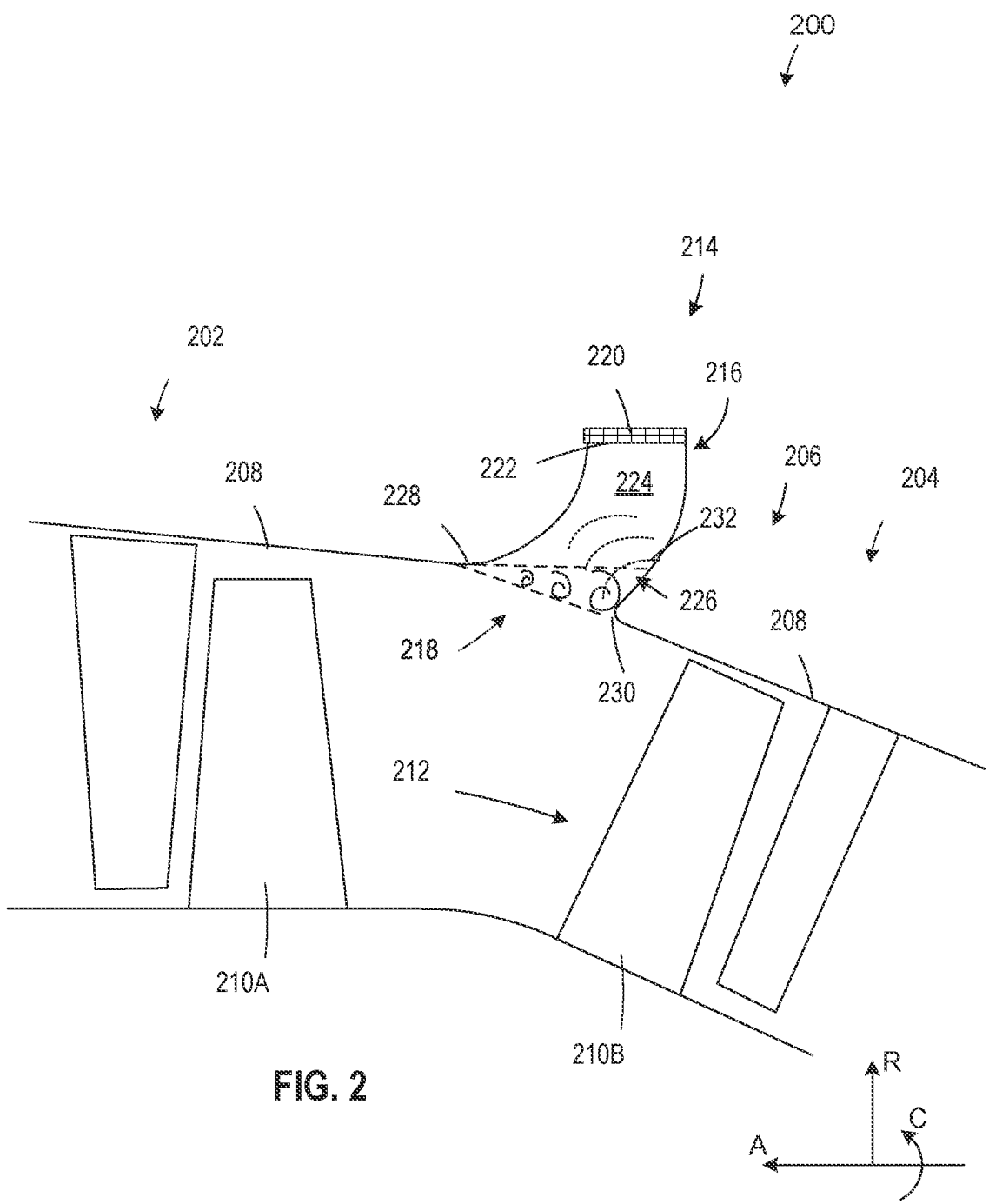
FIG. 2 is an illustration of a variable bleed valve port.

FIG. 2 is a partial cross-sectional view of an example compressor 200 of a turbine engine (e.g., turbofan engine 110 of FIG. 1), including a LP compressor (e.g., booster) stage 202 and a HP compressor stage 204. FIG. 2 illustrates the compressor 200 at a transition point 206 between the booster stage 202 and the HP compressor stage 204. The compressor 200 includes a casing 208. In FIG. 2, the casing 208 surrounds the booster stage 202 and the HP compressor stage 204. Additionally or alternatively, the booster stage 202 and the HP compressor stage 204 have distinct casings 208 connected via a linkage mechanism. The compressor 200 includes first blades 210A and second blades 210B. In operation, the blades (e.g., the blades 210A, 210B, etc.) of the compressor 200 spins, impelling air downstream. The casing 208 defines a mainstream flow path 212 (e.g., a first flow path, etc.) for airflow through compressor 200 (e.g., and the turbofan engine 110).

FIG. 2 illustrates an example variable bleed valve (e.g., VB valve, VBV, etc.) 214, including a VBV port (e.g., passage, opening, duct, etc.) 216 that defines a bleed flow path (e.g., secondary flow path) 218 and a VBV door 220 located at a VBV port exit 222. The VBV 214 can be actuated via an actuator (not illustrated). The actuator can move the VBV door 220 between an open position (e.g., to bleed air from the booster stage 202, etc.) and a closed position. In the closed position, the VBV door 220 covers the VBV port exit 222, closing off the VBV port 216.

In the closed position, the VBV door 220 is positioned at the VBV port 216 is a manner that produces a bleed cavity (e.g., open space, chamber, etc.) 224. The resultant bleed cavity 224 disrupts the airflow as it flows through the mainstream flow path 212, leading to acoustic resonance, compressor instabilities, and/or other issues. A shear layer 226 of the mainstream airflow can separate as it reaches an upstream edge (e.g., end, lip, etc.) 228 of the VBV port 216. As the shear layer 226 separates, the shear layer 226 impinges upon a downstream edge (e.g., end, lip, etc.) 230 of the VBV port 216, leading to feedback in the form of acoustic pressure waves 232. The pressure wave feedback causes vorticity (e.g., localized swirling/spinning of the flow, etc.) to shed into the shear layer in phase, causing resonant acoustic tones within the bleed cavity that can resonate with other mechanical components of the turbine engine and leading to the compressor instabilities and/or mechanical failure. Advantageously, the examples of FIGS. 3-6 eliminate or otherwise dampen the acoustic resonance.

Example VBVs are disclosed below in conjunctions with FIGS. 3-6 that are similar to the VBV 214 of FIG. 2. Similar to FIG. 2, the examples below can be integrated into a casing of a compressor, which defines a mainstream flow path for airflow through a gas turbine engine.

Figure 3:
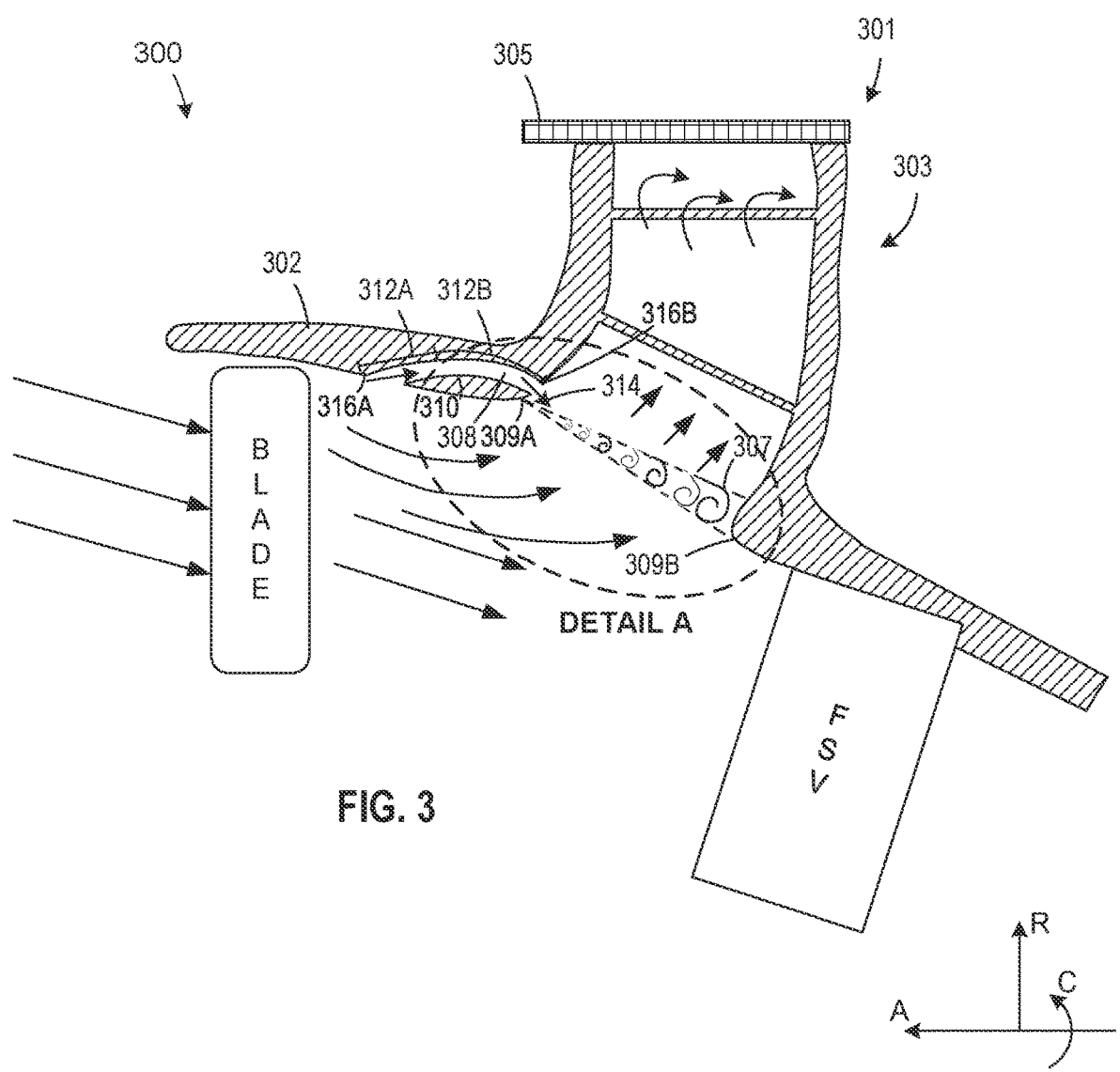
FIG. 3 is an illustration of an example variable bleed valve port and casing including a first channel implemented in accordance with the teachings of the disclosure.

FIG. 3 is a partial cross-sectional view of an example compressor 300 of a turbine engine (e.g., turbofan engine 110 of FIG. 1) implemented in accordance with the teachings of this disclosure. In FIG. 3, the compressor 300 includes a variable bleed valve (e.g., VB valve, VBV, etc.) 301, including a VBV port 303 and a VBV door 305. Unless stated otherwise, the VBV 301, VBV port 303, and the VBV door 305 have the same shape and functionality as the VBV 214 of FIG. 2, the VBV port 216 of FIG. 2 and the VBV door 222 of FIG. 2, respectively. In FIG. 3, the VBV door 305 is closed, preventing flow from flowing through the port 303.

In FIG. 3, the compressor 300 includes a casing segment 302. In FIG. 3, a disturbed shear layer 307 extends between a leading edge 309A of the VBV port 303 and a trailing edge 309B (e.g., the leading edge 309A and the trailing edge 309B defining an inlet of the VBV port 303, etc.). In FIG. 3, the casing segment 302 includes a channel 308. In FIG. 3, the channel 308 defines a flow path 310 (e.g., a channel flow path, a flow circuit, etc.) and includes a first portion 312A and a second portion 312B. In FIG. 3, flow exits the channel 308 as an incident flow 314 onto the disturbed shear layer 307 (e.g., when compared to the shear layer 226 of FIG. 2, etc.). In FIG. 3, the channel 308 has a first opening 316A and a second opening 316B. The channel 308 can direct the flow into or out of the axial-radial plane illustrated in FIG. 3. For example, the incident flow 314 can have a component in the axial-radial plane (e.g., have a non-zero value relative to the radial axis, etc.). In some such examples, the channel 308 can cause the incident flow 314 to have a different angular momentum than the shear layer 307, thereby modifying the mixing of the incident flow 314 and the shear layer 307.

In FIG. 3, the channel 308 receives flow from the flow path 218 and the incident flow 314 directs onto the disturbed shear layer 307 to reduce the instability (e.g., entropy, turbulence, etc.) of the disturbed shear layer 307. In some examples, the magnitude of the reduction of the instability of the disturbed shear layer 307 is dependent on the angle of incidence between the incident flow 314 and the disturbed shear layer 307. In some examples, the angle of incidence of the incident flow 314 is dependent on the geometry of the channel 308. The interaction between the incident flow 314 and the disturbed shear layer 307 is described below in conjunction with FIG. 4.

In FIG. 3, the channel 308 includes a first portion 312A downstream of the first opening 316A and a second portion 312B, upstream of the second opening 316B and downstream of the first portion 312A. In FIG. 3, the first portion 312A is a substantially straight (e.g., a curvature of zero, etc.), and the second portion 312B has a curvature (e.g., an arc, an elliptical curvature, a sinusoidal curvature, etc.). In other examples, the first portion 312A and/or the second portion 312B can have any suitable curvatures to ensure the incident flow 314 interacts with the disturbed shear layer 307 at the desired angle (e.g., the first portion 312A and the second portion 312B have a same curvature, the first portion 312A has a first curvature that is different than a second curvature of the second portion 312B, etc.). In some examples, the channel 308 can be composed of any number of suitable portions (e.g., three portions, four portions, etc.) having any suitable corresponding curvatures. Any suitable profile, geometry, shape, or otherwise may be utilized.

In FIG. 3, the first opening 316A, the second opening 316B and the channel 308 along the first portion 312A and the second portion 312B are circular. In FIG. 3, the channel 308 has a consistent/same cross-section throughout the length of the channel 308. In some such examples, the channel 308 has a consistent/same diameter throughout. In FIG. 3, the channel 308 has length based on the respective lengths of the first portion 312A and the second portion 312B. In other examples, the shape and/or size of the cross-section of the channel 308 can vary along the length of the channel 308 or be different at any portion of the channel 308. Again, any suitable profile, geometry, shape, or otherwise may be utilized.

In FIG. 3, the channel 308, except for the first opening 316A and the second opening 316B, is enclosed by the casing segment 302. In some examples, the channel 308 can be a groove formed in the inner wall of the casing segment 302. In some such examples, a portion of the channel 308 can be exposed to flow path 218. In some examples, to prevent excessive energy loss from flow interactions with the walls of the channel 308, the ratio of the length of the channel 308 to the width of the channel is between 6 and 10.

In other examples, the ratio of the length of the channel 308 to the width of the channel can be any suitable value.

Figure 4:
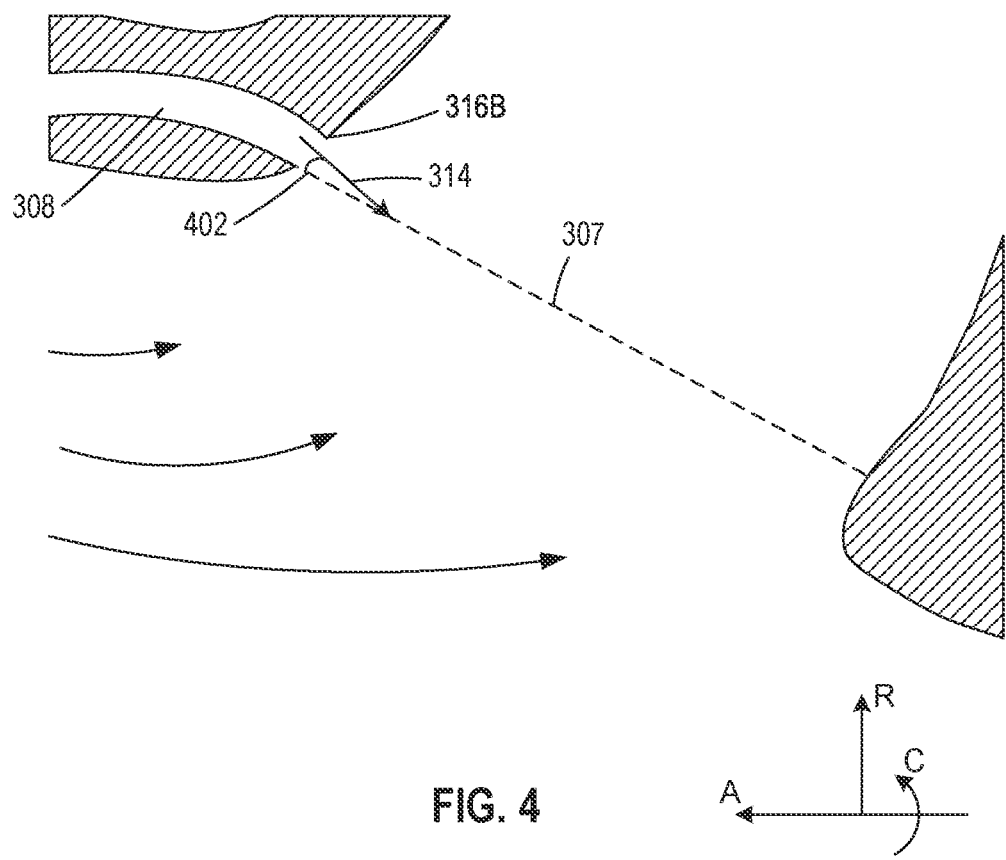
FIG. 4 is an illustration of the interaction of the channel flow air and the main flow of the variable bleed valve port.

FIG. 4 is a magnified view of an area labeled DETAIL A of FIG. 3. FIG. 4 illustrates the interaction of the incident flow 314 of FIG. 3 and the shear layer 307 of FIG. 3 of the variable bleed valve port 216. In FIG. 4, the incident flow 314 of FIG. 4 forms an incident angle 402 with the shear layer 307 (illustrated as the centerline of the shear layer 307). The incident angle 402 has a component on the axial-radial plane and a component on the axial-circumferential surface. In FIG. 4, the component of the incident angle 402 in the axial-circumferential surface is 30 degrees. In other examples, to reduce the instability of the shear layer 307, the component of the incident angle 402 on the circumferential axis can be any value between 0 degrees and 60 degrees (in either direction). In FIG. 4, the component of the incident angle 402 in the circumferential direction is 0 degrees. In other examples, to reduce the instability of the disturbed shear layer 307, the component of the incident angle 402 in the circumferential direction can be any value between −50 degrees and 50 degrees. In some examples, the relationship between the instability reduction of the shear layer 307 and the angle of the incident flow 402 is dependent on (1) the geometry of the casing segment 302 and the VBV port 303, (2) the condition of the flow, and/or any other suitable characteristic. In some such examples, the relationship between the incident angle 402 and the reduction in stability of the shear layer 307 can be determined via modeling (e.g., via turbulent flow modeling, etc.), empirically, and/or iteratively.

Figure 5:
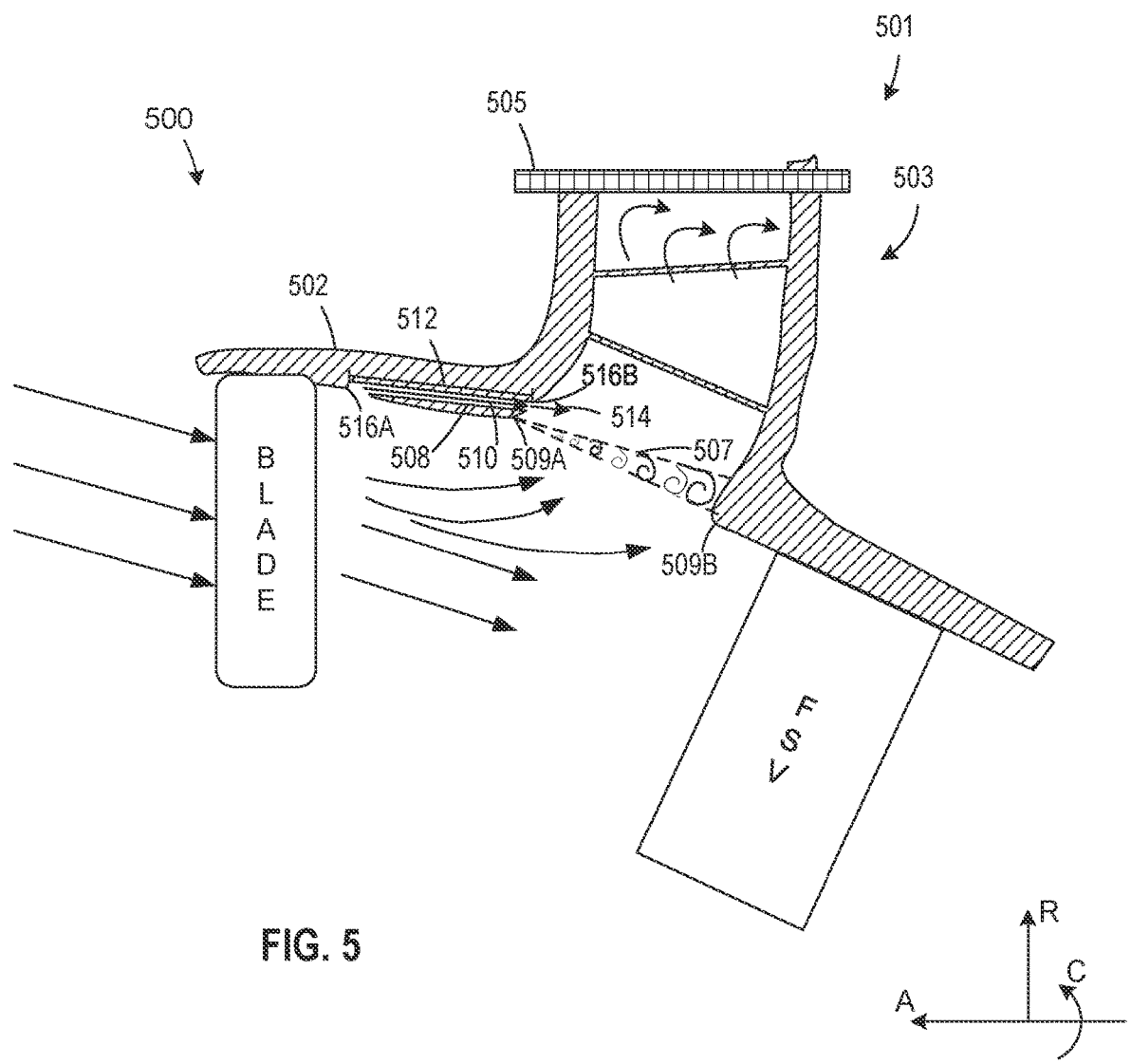
FIG. 5 is an illustration of an example variable bleed valve port including a second channel implemented in accordance with the teachings of the disclosure.

FIG. 5 is a partial cross-sectional view of another example compressor 500 of a turbine engine (e.g., turbofan engine 110 of FIG. 1) implemented in accordance with the teachings of this disclosure. In FIG. 5, the compressor 500 includes a variable bleed valve (e.g., VB valve, VBV, etc.) 501, including a VBV port 503 and a VBV door 505. Unless stated otherwise, the VBV 501, VBV port 503, and the VBV door 505 have the same shape and functionality as the VBV 214 of FIG. 2, the VBV port 216 of FIG. 2 and the VBV door 220 of FIG. 2, respectively. In FIG. 5, the VBV door 505 is closed, preventing flow from flowing through the port 503.

In FIG. 5, the compressor 500 includes a casing segment 502. A disturbed shear layer 507 extends between a leading edge 509A of the VBV port 503 and a trailing edge 509B of the VBV port 503 (e.g., the leading edge 509A and the trailing edge 509B defining an inlet of the VBV port 503, etc.). In FIG. 5, the casing segment 502 includes a channel 508. In FIG. 5, the channel 508 defines a flow path 510 (e.g., a channel flow path, a flow circuit, etc.) and includes a portion 512. In FIG. 5, flow exits the channel 508 as an incident flow 514 onto the shear layer 507. In FIG. 5, the channel 508 has an example first opening 516A and an example second opening 516B.

In FIG. 5, the channel 508 receives flow from the flow path 218 and the incident flow 514 directs onto the shear layer 507 to reduce the instability of the shear layer 507. In some examples, the magnitude of the reduction of the instability of the shear layer 507 is dependent on the angle of incidence between the incident flow 514 and the disturbed shear layer 307. In FIG. 5, the channel 508 is a singular straight portion. Unlike the channel 308 of FIG. 3, the channel 508 is composed of a single straight portion 512. The portion 512 of the channel 508 defines a single major axis that extends through the center of each of the first opening 516A and the second opening 516B.

Because the effectiveness of the incident flow 514 at reducing the instability of the shear layer 507 depends on the angle between the incident flow 514 and the shear layer 507, the configuration of the casing segment 502 and the channel 508 illustrated in FIG. 5 (e.g., including a single straight segment, etc.) is suitable for compressors 500 with inner walls that have comparatively inward large slopes (e.g., comparatively large reduction in the outer radius of the primary flow path from the upstream opening of the channel to the downstream opening of the channel, etc.).

In FIG. 5, the first opening 516A, the second opening 516B, and the channel 508 are circular. However, this need not be the case. In FIG. 5, the channel 508 has a consistent/same cross-section throughout the length of the channel 508. In some such examples, the channel 508 has a consistent/same diameter throughout. In other examples, the shape and/or size of the cross-section of the channel 508 can vary along the length of the channel 508 or be different at any portion of the channel 508. Further, the channel 508 can have any suitable profile, geometry, shape, or sizing.

In FIG. 5, the channel 508 is enclosed by the casing segment 502, other than the first opening 516A and the second opening 516B. In examples, the channel 508 can be a groove formed in the inner wall of the casing segment 502. In some such examples, a portion of the channel 508 can be exposed to flow path 218. In some examples, to prevent excessive energy loss from flow interactions with the walls of the channel 508, the ratio of the length of the channel 508 to the width of the channel (e.g., the diameter, etc.) is between 6 and 10. In other examples, the ratio of the length of the channel 508 to the width of the channel can be any suitable value.

Figure 6:
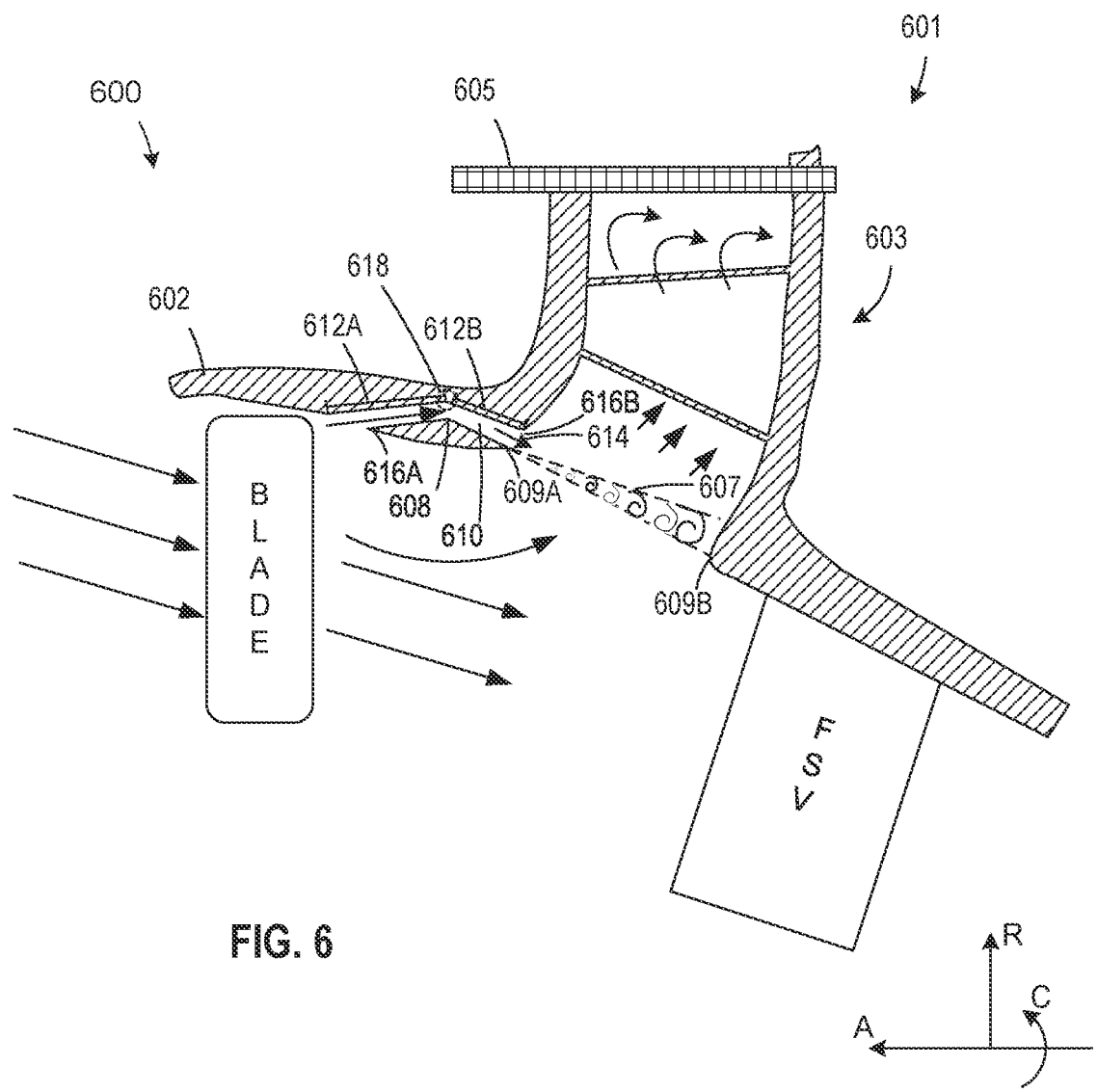
FIG. 6 is an illustration of an example variable bleed valve port including a third channel implemented in accordance with the teachings of the disclosure.

FIG. 6 is an illustration of an example variable bleed valve port including a third channel implemented in accordance with the teachings of the disclosure. In FIG. 6, the compressor 600 includes a variable bleed valve (e.g., VB valve, VBV, etc.) 601, including a VBV port 603 and a VBV door 605. Unless stated otherwise, the VBV 601, VBV port 603, and the VBV door 605 have the same shape and functionality as the VBV 214 of FIG. 2, the VBV port 216 of FIG. 2 and the VBV door 220 of FIG. 2, respectively. In FIG. 6, the VBV door 605 is closed, preventing flow from flowing through the port 603.

In FIG. 6, the compressor 600 includes a casing segment 602. In FIG. 6, a disturbed shear layer 607 extends between a leading edge 609A of the VBV port 603 and a trailing edge 609B of the VBV port 603 (e.g., the leading edge 609A and the trailing edge 609B defining an inlet of the VBV port 603, etc.). In FIG. 6, the casing segment 602 includes a channel 608. In FIG. 6, the channel 608 defines a flow path 610 (e.g., a channel flow path, a flow circuit, etc.) and includes a first portion 612A and a second portion 612B. In FIG. 6, flow exits the channel 608 as an incident flow 614 onto the shear layer 607. In FIG. 6, the channel 608 has a first opening 616A and a second opening 616B. The angle of the incident flow 614 depends on the geometry of the second portion 616B.

In FIG. 6, the channel 608 includes a first portion 612A downstream of the first opening 616A and a second portion 612B, upstream of the second opening 616B and downstream of the first portion 612A. In FIG. 6, the first portion 612A and the second portion 612B are substantially straight (e.g., a curvature of zero, etc.), which define a corresponding first major axis and a second major axis, respectively. In FIG. 6, the major axes of the first portions 612A and the second portion 612B form an angle 618. In FIG. 6, the angle 618 is 120 degrees. In other examples, the angle 618 can be any suitable angle between 0 degrees and 180 degrees. In some examples, the angle 618 can be rounded and/or smoothed (e.g., chamfered, filleted, beveled, etc.) In some examples, the magnitude of the angle 618 depends on the thickness of the casing segment 602 (e.g., a greater thickness of the casing segment 602 permits the angle 618 to be closer to zero degrees, etc.). In some examples, the channel 608 can be composed of any number of suitable portions (e.g., three portions, four portions, etc.) having any suitable lengths, curvatures, and angular relationships. In such example, the configuration of the channel 608 can determined/designed based on a desired location of the first opening 616A, a desired location of the second opening 616B, the thickness of the casing segment 602, and/or the desired angle of the incident flow 614.

In FIG. 6, the first opening 616A, the second opening 616B, and the channel 608 are circular. However, this need not be the case. In FIG. 6, the channel 608 has a consistent/same cross-section throughout the length of the channel 608. In some such examples, the channel 608 has a consistent/same diameter throughout. In FIG. 6, the channel 608 has a length based on the respective lengths of the first portions 612A and the second portion 612B. In other examples, the shape and/or size of the cross-section of the channel 608 can vary along the length of the channel 608 or be different at any portion of the channel 608. Further, the channel 608 can have any suitable profile, geometry, shape, or sizing.

In FIG. 6, the channel 608 is enclosed by the casing segment 602, other than the first opening 616A and the second opening 616B. In some examples, the channel 608 can be a groove formed in the inner wall of the casing segment 602. In some such examples, a portion of the channel 608 can be exposed to flow path 218. In some examples, to prevent excessive energy loss from flow interactions with the walls of the channel 608, the ratio of the length of the channel 608 to the width of the channel (e.g., the diameter, etc.) is between 6 and 10. In other examples, the ratio of the length of the channel 608 to the width of the channel can be any suitable value.

The channels 308, 508, 608 of FIGS. 3-6 can be formed in the casing segments 302, 502, 602 during the initial manufacturing/assembly of the casing segments 302, 502, 602 (e.g., via casting, via additive manufacturing, etc.). In other examples, the channels 308, 508, 608 can be formed in the casing segments 302, 502, 602 after the initial construction of the casing segments 302, 502, 602 (e.g., via conventional machining, via electrical discharge machining (EDM), laser beam machining, etc.). In other examples, the channels 308, 508, 608 of FIGS. 3-6 can be formed by any other suitable means.

The illustrated examples of FIGS. 3-6 are cross-sectional views of the compressors 300, 500, 600. It should be understood that the compressors 300, 500, 600 can include a plurality of channels similar to the channels 308, 508, 608, respectively, distributed circumferentially along the inner wall of the casing segments 302, 502, 602 and/or the outer diameter of the flow path 218. In some examples, the number of the plurality of the channels can depend on the diameter of the compressors 300, 500, 600, the size of the VBV, the number of stator blades, the number of rotor blades, etc. In some examples, the number of the plurality of the channels can be between 20 and 100. In some examples, the number of the plurality of the channels and the geometry of the channels (e.g., the diameter of the channel, etc.) is such that the solidity ratio about the circumferential direction is less than 0.5. For example, the configuration of the channels in the flow path with a radius (R) can be such that the ratio of engine circumference occupied by the channels (e.g., the product of the number of channels (N) and the diameter of each channel, etc.) to the engine circumference (C) is less than 0.5

$$\left(\text{e.g.,}\ \frac{N \times D}{C} = \frac{N \times D}{2\pi R} < 0.5,\ \text{etc.}\right).$$

In some examples, the geometries of each of the plurality of the channels can be the same as the geometry of the channels 308, 508, 608. In other examples, the geometries of each of the plurality of the channels can vary.

Although each of the example casing segments 302, 502, 602 disclosed above has certain features, it should be understood that it is not necessary for a particular feature of one of the example casing segments 302, 502, 602 to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features. Features of the casing segments 302, 502, 602 disclosed above may be combined, divided, re-arranged, omitted, eliminated, and/or implemented in any other way.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

From the foregoing, it will be appreciated that example systems, apparatus, and articles of manufacture have been disclosed that enable manufacture of an advantageous VBV. Examples disclosed herein include channels that disrupt and reduce an energy and an instability of the shear layers formed in the VBV cavities. Examples disclosed herein enable a VBV that eliminates or otherwise reduces an acoustic tone generated within a bleed cavity of a VBV port. Accordingly, examples disclosed herein minimize or otherwise reduce aero-acoustic excitations in the bleed cavity. Examples disclosed reduce stress on booster components and increase part life and time on wing. Examples disclosed herein can be retrofitted (e.g., by machining a channel into existing cases, etc.).

Further aspects of the present disclosure are provided by the subject matter of the following clauses:

Example 1 includes an apparatus, comprising a casing segment defining a first flow path, a variable bleed valve port defining a second flow path, and a channel formed in the casing segment, the channel including a first opening into the first flow path, and a second opening into the second flow path, the channel defining a third flow path between the first opening and the second opening.

Example 2 includes the apparatus of any preceding clause, wherein the channel further includes a first portion including the second opening, the first portion forming a first angle with a circumferential axis and a second angle with a radial axis, the first angle between 30 degrees and 60 degrees, the second angle between 0 degrees and 50 degrees.

Example 3 includes the apparatus of any preceding clause, wherein the channel includes a first portion including the first opening and the second opening, the first portion having a major axis, the major axis intersecting a first center of the first opening and a second center of the second opening.

Example 4 includes the apparatus of any preceding clause, wherein the channel includes a first portion including the first opening, the first portion including a first curvature.

Example 5 includes the apparatus of any preceding clause, wherein the channel includes a second portion including the second opening, the second portion including a second curvature different than the first curvature.

Example 6 includes the apparatus of any preceding clause, wherein the channel includes a first portion including the first opening, the first portion having a first major axis, and a second portion including the second opening, the second portion having a second major axis, the first major axis forming a first angle with the second major axis.

Example 7 includes the apparatus of any preceding clause, wherein the channel is enclosed by the casing segment.

Example 8 includes the apparatus of any preceding clause, wherein the channel is a first channel, further including a plurality of channels including the first channel, each of the plurality of channels have a same geometry.

Example 9 includes the apparatus of example 8, wherein the plurality of channels includes at least 20 channels.

Example 10 includes the apparatus of any preceding clause, wherein the channel has a length between the first opening and the second opening, and a width, a ratio of the length to the width being between 6 and 10.

Example 11 a gas turbine engine, comprising a compressor, and an apparatus comprising a casing surrounding the compressor, the casing defining a first flow path, a variable bleed valve port defining a second flow path, and a channel formed in the casing, the channel including a first opening into the first flow path, and a second opening into the second flow path, the channel defining a third flow path form between the first opening and the second opening.

Example 12 includes the gas turbine engine of any preceding clause, wherein the channel further includes a first portion including the second opening, the first portion forming a first angle with a circumferential axis and a second angle with a radial axis, the first angle between 30 degrees and 60 degrees, the second angle between 0 degrees and 50 degrees.

Example 13 includes the gas turbine engine of any preceding clause, wherein the channel includes a first portion including the first opening and the second opening, the first portion having a major axis, the major axis intersecting a first center of the first opening and a second center of the second opening.

Example 14 includes the gas turbine engine of any preceding clause, wherein the channel includes a first portion including the first opening, the first portion including a first curvature.

Example 15 includes the apparatus of any preceding clause, wherein the channel includes a second portion including the second opening, the second portion including a second curvature different than the first curvature.

Example 16 includes the gas turbine engine of any preceding clause, wherein the channel includes a first portion including the first opening, the first portion having a first major axis, and a second portion including the second opening, the second portion having a second major axis, the first major axis forming a first angle with the second major axis.

Example 17 includes the gas turbine engine of any preceding clause, wherein the channel is enclosed by the casing.

Example 18 includes the gas turbine engine of any preceding clause, wherein the channel is a first channel, further including a plurality of channels including the first channel, each of the plurality of channels have a same geometry.

Example 19 includes the gas turbine engine of any preceding clause, wherein the plurality of channels includes at least 20 channels.

Example 20 includes the gas turbine engine of any preceding clause, wherein the channel has a length between the first opening and the second opening, and a width, a ratio of the length to the width being between 6 and 10.

Example 21 includes an apparatus, comprising a casing segment defining a first flow path, a variable bleed valve port defining a second flow path, the variable bleed valve port having an inlet and wherein the inlet is adjacent to the first flow path and a channel formed in the casing segment, the channel including a first opening into the first flow path, and a second opening into the second flow path at the inlet, the channel defining a third flow path between the first opening and the second opening.

Although certain example systems, apparatus, and articles of manufacture have been disclosed herein, the scope of coverage of this patent is not limited thereto. On the contrary, this patent covers all systems, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus, comprising:
   a compressor casing segment defining a first flow path;
   a variable bleed valve port defining a second flow path; and
   a channel formed in the compressor casing segment upstream of a leading edge of the variable bleed valve bleed port, the channel including:
      a first opening into the first flow path; and
      a second opening into the second flow path, the channel defining a third flow path between the first opening and the second opening.

2. The apparatus of claim 1, wherein the channel further includes a first portion including the second opening, the first portion forming a first angle with a circumferential axis and a second angle with a radial axis, the first angle between 0 degrees and 60 degrees, the second angle between 0 degrees and 50 degrees.

3. The apparatus of claim 1, wherein the channel includes a first portion including the first opening and the second opening, the first portion having a major axis, the major axis intersecting a first center of the first opening and a second center of the second opening.

4. The apparatus of claim 1, wherein the channel includes a first portion including the first opening, the first portion including a first curvature.

5. The apparatus of claim 4, wherein the channel includes a second portion including the second opening, the second portion including a second curvature different than the first curvature.

6. The apparatus of claim 1, wherein the channel includes:
   a first portion including the first opening, the first portion having a first major axis; and
   a second portion including the second opening, the second portion having a second major axis, the first major axis forming a first angle with the second major axis.

7. The apparatus of claim 1, wherein the channel is enclosed by the casing segment.

8. The apparatus of claim 1, wherein the channel is a first channel, further including a plurality of channels including the first channel, each of the plurality of channels have a same geometry.

9. The apparatus of claim 8, wherein the plurality of channels includes at least 20 channels.

10. The apparatus of claim 1, wherein the channel has:
    a length between the first opening and the second opening; and
    a width, a ratio of the length to the width being between 6 and 10.

11. A gas turbine engine, comprising:
    a compressor; and
    an apparatus comprising:
       a casing surrounding the compressor, the casing defining a first flow path;
       a variable bleed valve port defining a second flow path; and
       a channel formed in the casing upstream of a leading edge of the variable bleed valve bleed port, the channel including:
          a first opening into the first flow path; and a second opening into the second flow path, the channel defining a third flow path between the first opening and the second opening.

12. The gas turbine engine of claim 11, wherein the channel further includes a first portion including the second opening, the first portion forming a first angle with a circumferential axis and a second angle with a radial axis, the first angle between 30 degrees and 60 degrees, the second angle between 0 degrees and 50 degrees.

13. The gas turbine engine of claim 11, wherein the channel includes a first portion including the first opening and the second opening, the first portion having a major axis, the major axis intersecting a first center of the first opening and a second center of the second opening.

14. The gas turbine engine of claim 11, wherein the channel includes a first portion including the first opening, the first portion including a first curvature.

15. The gas turbine engine of claim 14, wherein the channel includes a second portion including the second opening, the second portion including a second curvature different than the first curvature.

16. The gas turbine engine of claim 11, wherein the channel includes:
    a first portion including the first opening, the first portion having a first major axis; and
    a second portion including the second opening, the second portion having a second major axis, the first major axis forming a first angle with the second major axis.

17. The gas turbine engine of claim 11, wherein the channel is enclosed by the casing.

18. The gas turbine engine of claim 11, wherein the channel is a first channel, further including a plurality of channels including the first channel, each of the plurality of channels have a same geometry.

19. The gas turbine engine of claim 18, wherein the plurality of channels includes at least 20 channels.

20. The gas turbine engine of claim 11, wherein the channel has:
    a length between the first opening and the second opening; and
    a width, a ratio of the length to the width being between 6 and 10.

* * * * *